US012675614B2

(12) United States Patent
Laloi

(10) Patent No.: US 12,675,614 B2
(45) Date of Patent: Jul. 7, 2026

(54) COMPUTER-IMPLEMENTED METHOD OF ESTIMATING A MASS DISTRIBUTION OF A PHYSICAL PRODUCT

(71) Applicant: Dassault Systemes, Velizy Villacoublay (FR)

(72) Inventor: Alexandre Laloi, Rueil-Malmaison (FR)

(73) Assignee: Dassault Systemes, Velizy Villacoublay (FR)

( * ) Notice: Subject to any disclaimer, the term of this patent is extended or adjusted under 35 U.S.C. 154(b) by 813 days.

(21) Appl. No.: 16/689,999

(22) Filed: Nov. 20, 2019

(65) Prior Publication Data

US 2020/0201947 A1     Jun. 25, 2020

(30) Foreign Application Priority Data

Dec. 21, 2018     (EP) ..................................... 18306796

(51) Int. Cl.
*G06F 30/00* (2020.01)
*G06F 16/22* (2019.01)
(Continued)

(52) U.S. Cl.
CPC .......... *G06F 30/00* (2020.01); *G06F 16/2228* (2019.01); *G06F 30/15* (2020.01); *G06F 2111/04* (2020.01)

(58) Field of Classification Search
CPC ... G06F 30/00; G06F 16/2228; G06F 2111/04
See application file for complete search history.

(56) References Cited

U.S. PATENT DOCUMENTS

2004/0195439 A1     10/2004     Masaki
2007/0282571 A1     12/2007     Mostafa

FOREIGN PATENT DOCUMENTS

CN          107918698 A     4/2018
CN          108763691 A     11/2018
(Continued)

OTHER PUBLICATIONS

Anwar, S., Axinte, D. A., & Becker, A. A. (2013). Finite element modelling of overlapping abrasive waterjet milled footprints. Wear, 303(1-2), 426-436. (Year: 2013).*
(Continued)

*Primary Examiner* — Bijan Mapar
(74) *Attorney, Agent, or Firm* — Hamilton, Brook, Smith & Reynolds, P.C.

(57)          ABSTRACT

A computer-implemented method estimates a mass distribution of a physical product comprising a plurality of product parts. The method: a) creates a data structure comprising, for each part, data representing position and orientation of the part, its mass of the part, preferably its tolerance associated to each mass of the part, and its geometry in voxel format; b) decomposes a digital model of the physical product into a plurality of parallel slices (SL1); c) for each slice, uses the data structure for identifying a set of product parts of the data structure overlapping with the slice and determining a respective overlap rate; and d) attributes to each slice a mass value corresponding to a sum of the masses of all product parts overlapping with the slice, weighted by the respective overlap rates. A computer program product, non-transitory computer-readable data-storage medium, a computer system and a Computer Aided Design (CAD) Systems carry out such a method.

13 Claims, 5 Drawing Sheets

(51) Int. Cl.
  G06F 30/15    (2020.01)
  G06F 111/04    (2020.01)

(56)         References Cited

FOREIGN PATENT DOCUMENTS

CN        108959695  A    12/2018
JP      2004-090909  A    3/2004

OTHER PUBLICATIONS

Castellazzi, G., D'Altri, A. M., Bitelli, G., Selvaggi, I., & Lambertini, A. (2015). From laser scanning to finite element analysis of complex buildings by using a semi-automatic procedure. Sensors, 15(8), 18360-18380. (Year: 2015).*

Hansch, D.L., et al., "Methods of Determining the Longitudinal Weight Distribution of a Ship" Hampton Roads Section of the Society of Naval Architects and Marine Engineers Hampton Roads Chapter of the Society of Allied Weight Engineers, Jan. 24, 2008. https://www.sawe.org/files/Methods%20o  f%20Longitudinal% 20Weight%20Distribution.pdf.

Search Report for European Application No. 18306796.6 dated Jul. 5, 2019.

* cited by examiner

COMPUTER-IMPLEMENTED METHOD OF ESTIMATING A MASS DISTRIBUTION OF A PHYSICAL PRODUCT

RELATED APPLICATION

This application claims priority under 35 U.S.C. § 119 or 365 to European, Application No. 18306796.6, filed Dec. 21, 2018. The entire teachings of the above application are incorporated herein by reference.

FIELD OF INVENTION

The invention pertains to the field of Computer Aided Engineering (CAE) and, more precisely, of Computer Aided Design (CAD). It relates to a computer-implemented method of estimating the mass distribution of a physical product constituted by a plurality of product parts, such as a ship or boat, an aircraft, a terrestrial vehicle, a building, a machine tool or the like.

BACKGROUND

Mass—and therefore weight—distribution, as well as the total mass/weight, strongly affects the mechanical behavior and resistance of physical products, and is often of critical importance.

A particular dramatic example is provided by the shipping industry, where the total weight of a ship strongly affects its stability, and an inappropriate weight distribution may even cause the hull to break in the middle in rough sea conditions.

In the car industry, the mass distribution may be required to peak near the axles and be minimal between them.

Aircraft makers are interested in the distribution of mass—and therefore inertia—along the wings.

And so on.

Surprisingly enough, however, no existing tool allows precisely estimating the mass distribution of a complex physical product, comprising thousands—or even millions—of individual product parts such as beams, plates, bolts, cogwheels, etc. Even estimating the total mass of such a product before actually manufacturing it is a challenge—the computation is usually performed using a simple spreadsheet, requiring a large amount of work and leading to inaccurate results.

The more complex task of computing the mass distribution of a physical product along an axis (often a longitudinal axis, e.g. in the case of a ship) can only be carried out relying on very strong approximation.

For instance, a very rough approximation of the mass distribution of a ship may be obtained by a simple geometrical modelling of the ship—e.g. a rectangle flanked by two trapezoids.

Slightly more accurate estimations may be obtained by the so-called "grouping methods" wherein a limited number (a few tens) of macro-parts, representing whole sub-systems, are taken into account. The simplest of them the "bucket method", a line of metaphorical "buckets" is disposed along the longitudinal line of the ship. If the center of gravity of a macro-part falls within a bucket, all its mass is "put" in the bucket. It is clear that this approach leads to very significant errors. For instance, a macro-part may represent paint, which is spread on all surfaces of the ship, yet will be modeled by a single mass value in a bucket situated towards the center of the ship's longitudinal axis.

To the best knowledge of the inventor, the most accurate commercially available software tool for computing the longitudinal mass distribution of a ship is "Shipweight" (http://shipweight.com) which models macro-parts using trapezoids. The accuracy of the method is nevertheless low, given that it relies on a rough modelling of the ship comprising a small number of macro-part, while a full digital mock-up may comprise up to several millions individual parts.

The methods mentioned above are described in more detail in the paper by David Laurence Hansch "Methods of determining the longitudinal weight distribution of a ship" in 67th Annual conference of the International Society of Allied Weight Engineers, Society of Allied Weight Engineers Inc. Seattle, USA, 2008.

SUMMARY

The invention aims at overcoming these drawbacks of the prior art. More precisely, it aims at providing a computer-implemented method of estimating a mass distribution of a physical product constituted by a large number of parts which is more accurate than the prior art, while keeping its computational complexity at an acceptable level ("scalability"). Subsidiarily, the invention also aims at dealing with incomplete information on some or all the product parts (for instance, the geometry of parts supplied by third parties may be insufficiently defined), at quantifying a tolerance of the estimated mass and mass distribution and/or at facilitating cooperative design.

According to the invention, at least some of these aims are achieved thanks to a data structure (an "index") comprising, for each product part of a detailed digital mock-up of the product, data representing the position and orientation of the part within the product, the mass of the part and, for at least some product parts, the part geometry in voxel format, and preferably in n-tree (usually, octree) voxel format. The use of voxel format for modelling the part geometry is important as it allows a simple and fast computation of an overlap rate (i.e. the fraction of the volume of the part which overlaps with the slice) of each product part with every one of a plurality of slices into which the product is notionally cut. This, in turn, allows allocating to each slice the correct share of each part's mass.

An object of the present invention is therefore a computer-implemented method of estimating a mass distribution of a physical product comprising a plurality of product parts, the method comprising the steps of:

a) creating a data structure comprising, for each product part, data representing a position and orientation of the part within the product, data representing a mass of the part and, for at least some product parts, data representing part geometry in voxel format;

b) decomposing a digital model of the physical product into a plurality of slices perpendicular to a same axis, each slice being identified by its position along the axis;

c) for each slice, using the data structure for identifying a set of product parts of the data structure wholly or partially overlapping with the slice and, for each product part of the set, determining an overlap rate of the part and the slice; and d) attributing to each slice a mass value corresponding to a sum of the masses of all product parts overlapping with the slice, weighted by the respective overlap rates.

According to particular embodiments of the inventive method:

In step c), at least one product part for which the data structure contains no geometry data may be considered to fully overlap with a single slice, determined by the position and orientation data of the product part in the data structure.

The data structure may contain, for at least one product part for which it does not contain geometry data: data identifying a subset of the product to which said product part belongs, and data representing the geometry of said subset of the product in n-tree voxel format; and step c) may comprise identifying slices wholly or partially overlapping with the product part and the respective overlap rates based on the geometry of the subset of the product to which said product part belongs.

Step a) may comprise converting data representing product part geometries into voxel format. Said voxel format is advantageously a n-tree, and preferably octree, voxel format.

The method may further comprise a step of:

e) estimating a mass distribution of the product along said axis by interpolating and smoothing the mass values attributed to the positions along the axis identifying each of said slices.

The data structure may also comprise, for at least one product part, data representing a mass tolerance and wherein step d) further comprises computing a tolerance for the mass values attributed to the positions along the axis identifying each slice overlapping with said product part.

Step a) may also comprise incrementally creating a data structure during a physical product design process by extracting product part data from one or more physical product design files.

Another object of the invention is a computer program product, stored on a non-transitory computer-readable data-storage medium, comprising computer-executable instructions to cause a computer system to carry out such a method.

Another object of the invention is a non-transitory computer-readable data-storage medium containing computer-executable instructions to cause a computer (CPT) system to carry out such a method.

Another object of the invention is a Computer Aided Design system comprising a processor coupled to a non-transitory memory and a graphical user interface, the non-transitory memory storing computer-executable instructions to cause the Computer Aided Design system to carry out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, wherein.

DETAILED DESCRIPTION

A description of example embodiments follows.

The teachings of all patents, published applications and references cited herein are incorporated by reference in their entirety.

In the following, "mass" and "weight" will be considered synonyms. Indeed, "weight distribution" is the expression commonly used in industry but, from a physical point of view, "mass distribution" would be more exact.

The invention relies on two software infrastructures that cohabit, and which will be called "build" and the "run". Advantageously, both infrastructures are stored on and executed by dedicated hardware, different from the computers used by a team of designers for designing the physical products whose mass distribution is to be estimated. This ensures that the mass distribution estimation does not slow down the design process.

Figure 1:
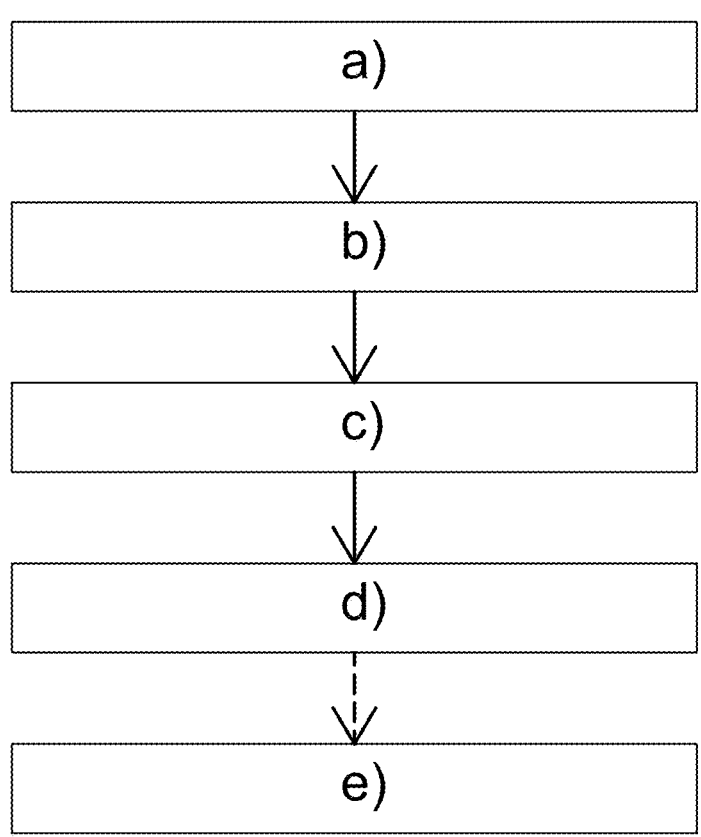
FIG. 1 is a flow-chart of a method according to an embodiment of the invention.
Figure 2:
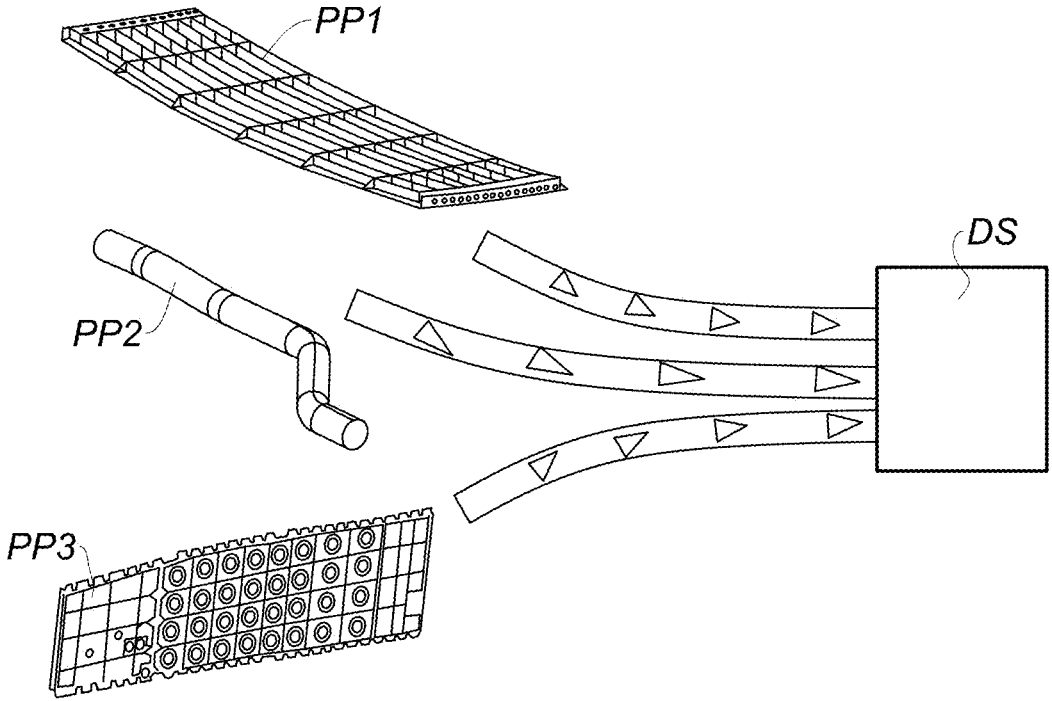
FIG. 2 is a schematic illustration of a first step a) of said method, comprising creating a data structure.

The first step of the inventive method—block "a)" of the flow-chart of FIG. 1—is carried out by the "build" infrastructure. It consists in creating a data structure, or "cache" that indexes product part data which may come from different sources (files stored on different computers of a network, possibly in different formats). This step is illustrated schematically on FIG. 2, where data pertaining to product parts PP1, PP2 and PP3 are gathered and indexed in data structure DS.

The indexed data represent, for each product part, its position and orientation within the product (i.e. in a reference frame affixed to the product), as well as its mass (or, equivalently, weight). Advantageously, the data also represent a tolerance or incertitude of the mass value of at least some parts. For all or at least some of the parts, moreover, data representing the shape ("geometry") of the part are also provided. Often, albeit not always, part geometry data are provided in a tessellated format, i.e. a solid part is represented by a three-dimensional surface formed by polygons, often triangles.

Figure 3:
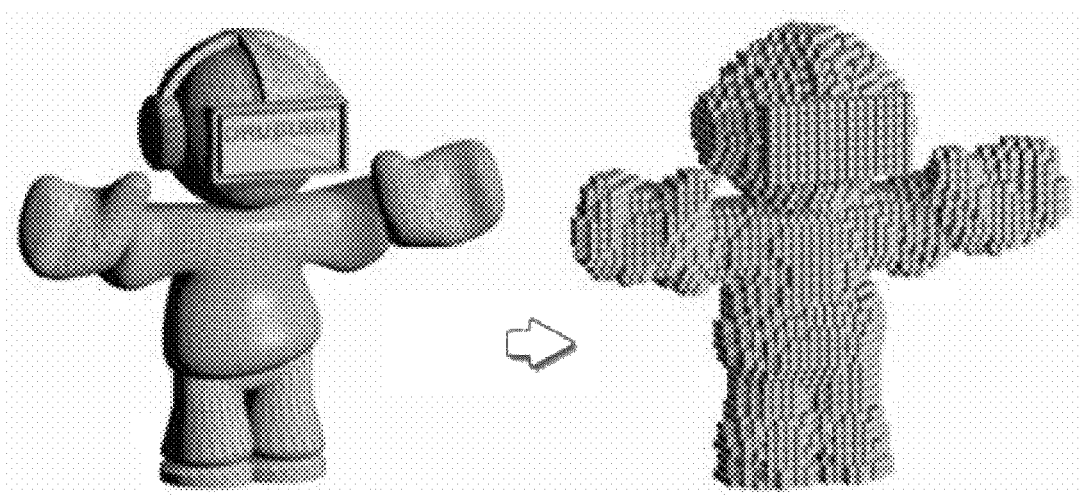
FIG. 3 illustrates the voxelisation of a tessellated geometry.

During the indexation process, the data are re-organized. In particular, an alternate geometry is attached to each element, based on a voxel-based format, and preferably on n-tree voxel technology. FIG. 3 represents the transformation of a tessellated geometry (left) into a voxel-based one (right).

Figure 4:
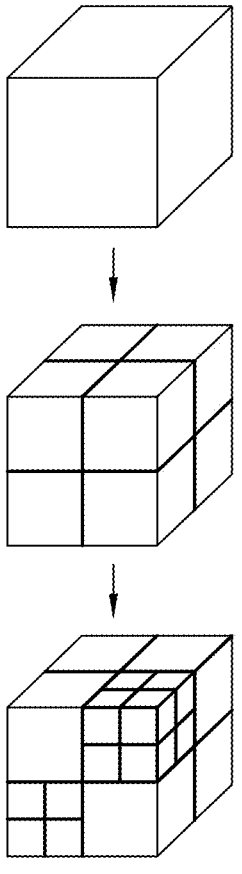
FIG. 4 illustrates the octree voxel format used in a preferred embodiment of the invention.

FIG. 4 illustrates the principle of a n-tree voxel representation of geometry for the case n=3 ("octree"). A cube is defined, which encompasses the product part geometry to be represented (upper part of the figure). This cube is then split into eight octants (smaller cubes), arranged in a 2×2×2 three-dimensional array (middle part of the figure); more generally, in an arbitrary n-tree representation, the volume is split into $2^n$ smaller volumes. The cubes which contain part of the geometry are split again (lower part of the figure), those which do not contain part of the geometry are not split. The process is carried out recursively, over a predetermined number of recursion (e.g. 7). At the end of the process, the cubes form an approximated representation of the product part, having a significantly smaller memory occupation than one based on uniform voxels. Moreover, the representation is conveniently stored in a tree-based data structure. The use of the efficient n-tree representation is important to ensure the "scalability" of the inventive method (i.e. its aptitude to deal with a large number of parts) and to keep the computational burden acceptable.

For parts whose geometry is unavailable, the data structure contains data identifying a subset of the product to which said product part belongs and data representing the geometry of said subset of the product in (n-tree) voxel format. For instance, the geometry of a turbine blade in an airplane engine may be unknown, but it is known that the blade belongs to a turbine, having a known geometry (which is also represented in voxel format). The mass of these parts is considered to be uniformly spread within the corresponding subset of the product. Alternatively, the product parts whose geometry is unknown are considered as point mass— i.e. the mass is considered to be concentrated in a single point, identified by the positional data.

Figure 5:
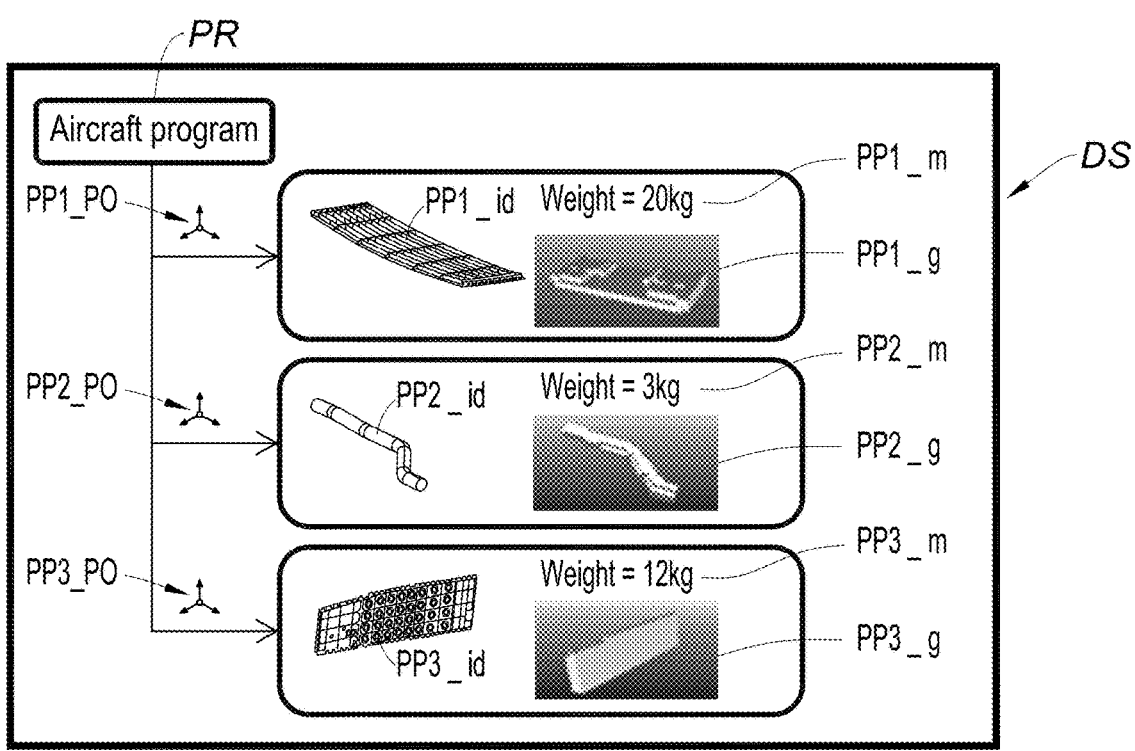
FIG. 5 is a schematic illustration of the data structure created in step a) of the inventive method.

FIG. 5 is a symbolic representation of the data structure DS representing a physical product PR (e.g. an aircraft) comprising three parts PP1, PP2, PP3. Each part is associated to a record of the data structure, comprising an identifier (PP1_Id, PP2_Id, PP3_Id), position/orientation data (PP1_PO, PP2_PO, PP3_PO), a mass/weight value (PP1_$m$, PP2_$m$, PP3_$m$) and a voxel-based geometry (PP1_$g$, PP2_$g$, PP3_$g$). Optionally, the record may also comprise a tolerance value (not represented on the figure).

Advantageously, the data structure is created incrementally during a design process, by updating it at periodic intervals.

At any time, a mass distribution computation of the partially or wholly designed product (steps b) to e) of the flow-chart of FIG. 1) may be carried out by launching the "run" infrastructure. Due to the incremental building of the data structure DS, a first mass distribution computation can be performed at the very beginning of a design project, at a moment where the definition of the project is still not mature. This enables the program manager to take the right decision from the very beginning, thus not affecting much the cost of the program. Moreover, additional computations may be performed regularly during the advancement of the project, to ensure that design constraints are respected and to detect "wrong tracks" as early as possible.

A user (e.g. a "weight manager") may launch the "run" infrastructure by performing a predetermined action on a user interface ("front-end"), e.g. by clicking on an icon.

Figure 6:
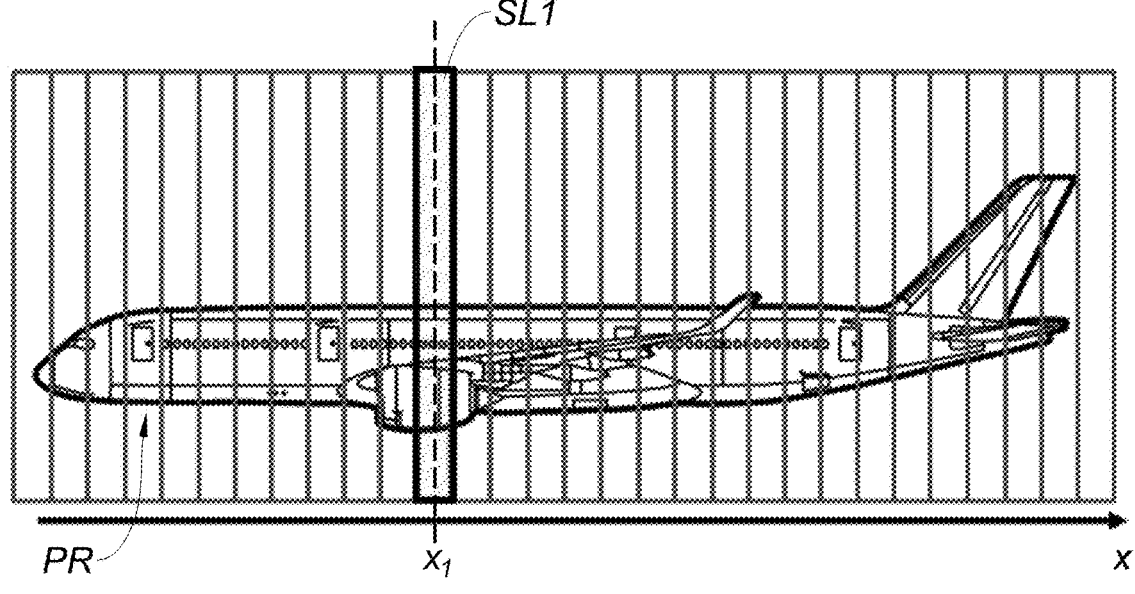
FIG. 6 illustrates a second step b) of the inventive method, comprising decomposing a digital model of a physical product into a plurality of slices.

Step b) of the inventive method consists in decomposing a digital model (mock-up) of the physical product into a plurality of slices, parallel to each other and perpendicular to an axis "x" along which the mass distribution is to be computed. Each slice is identified by its position along the axis—for instance, slice SL1 corresponds to position x1. This is illustrated on FIG. 6.

Step c) of the inventive method consists in identifying the product parts overlapping with each slice, and the corresponding overlap rate (parts represented by a mass point fully overlap on a single slice). This operation is carried out using the position and geometry data stored in the data structure. The computation of the overlap rates is greatly accelerated by the use of a voxel-based representation of the geometries.

Figure 7:
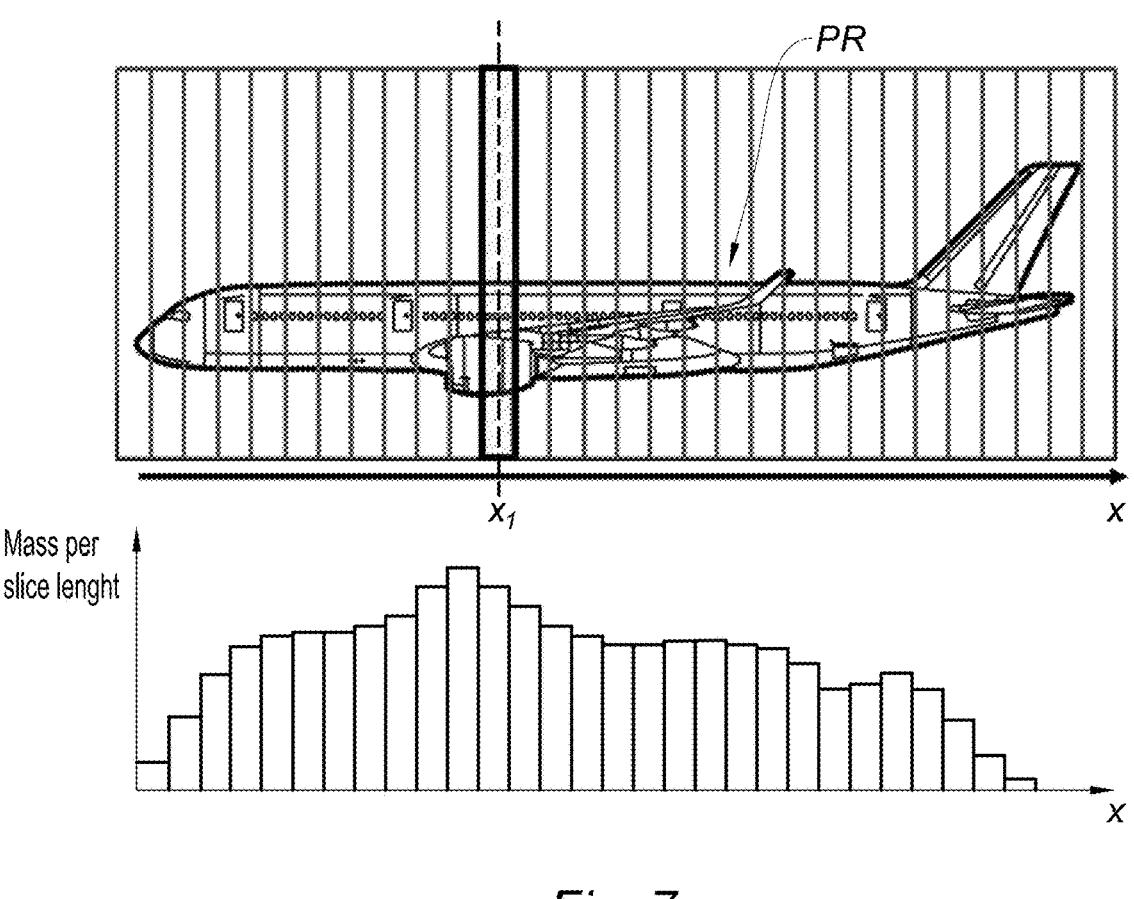
FIG. 7 illustrates a third and a fourth steps c) and d) of the inventive method, comprising decomposing a digital model of a physical product into a plurality of slices.

Step d) of the inventive method consists in attributing to each slice a mass value corresponding to a sum of the masses of all product parts overlapping with the slice, weighted by the respective overlap rates. This operation is carried out using the mass data stored in the data structure and the overlap rates computed at step c). The result is a discrete mass distribution, as shown on FIG. 7.

Advantageously, the overall statistical tolerance of the mass distribution is also computed during step d), based on the tolerance values stored, for each part, in the data structure and on the tolerance of the voxel representation in comparison to a tessellated representation. The overall tolerance on the mass value of a slice is the square root of the sum of the square of the tolerances on the mass values of each element. The tolerance value of an element depends on the one hand on its "intrinsic" tolerance, stored in the data structure, and on the other and on the number of "edge" voxels (to account for the "quantization error" on the volume introduced by the voxelization of the geometry).

Figure 8:
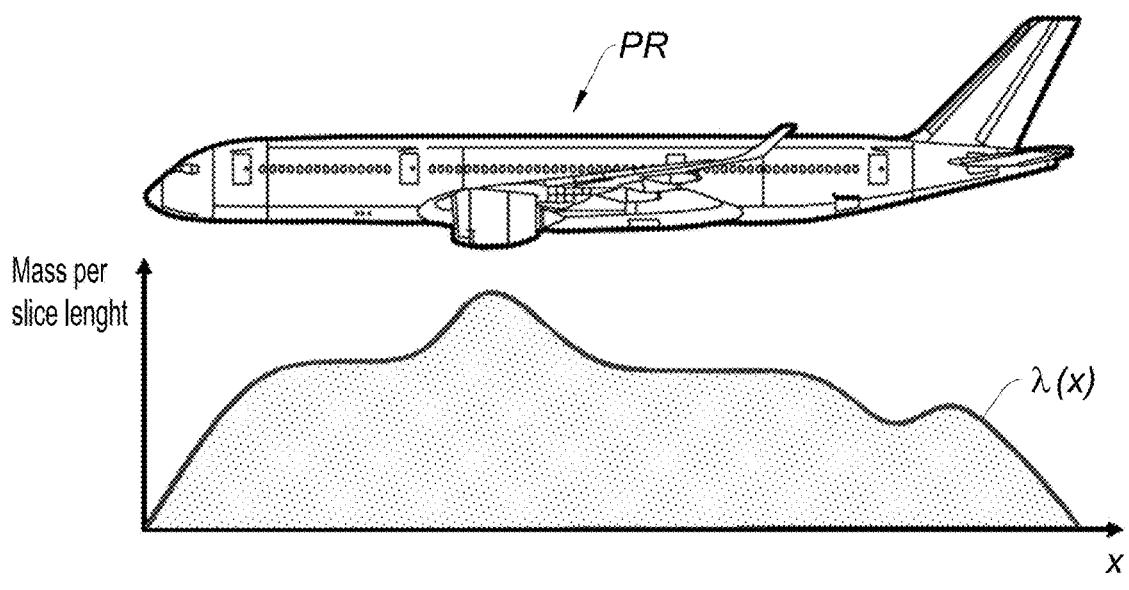
FIG. 8 illustrates a fifth, optional step of the inventive method of interpolating and smoothing the discrete mass distribution computed at step d)

A smoothing and interpolation step e) may then lead to the final estimation of the linear mass distribution $\lambda(x)$. This is represented on FIG. 8.

Figure 9:
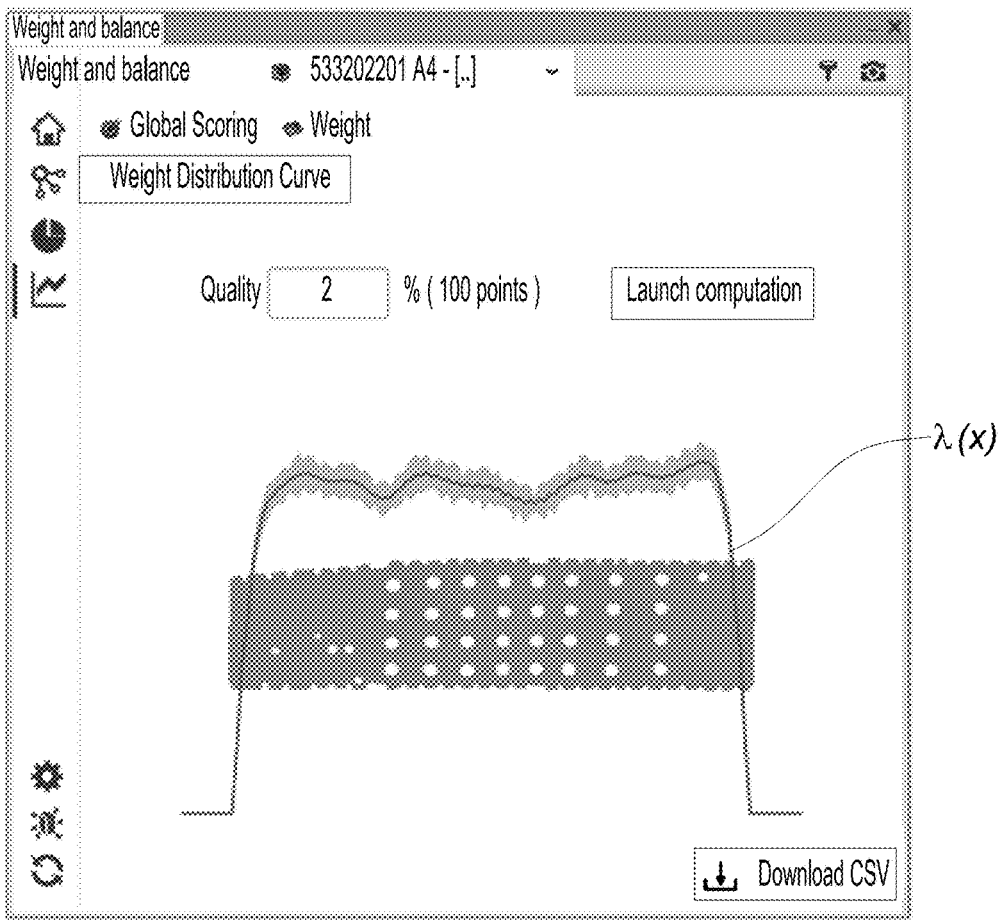
FIG. 9 shows a graphical user interface displaying a weight distribution estimated using the inventive method.

FIG. 9 is a screenshot showing a graphical representation of the linear mass distribution of a physical product according to an axis. The gray zone surrounding curve $\lambda$ corresponds to the computed tolerance.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 10:
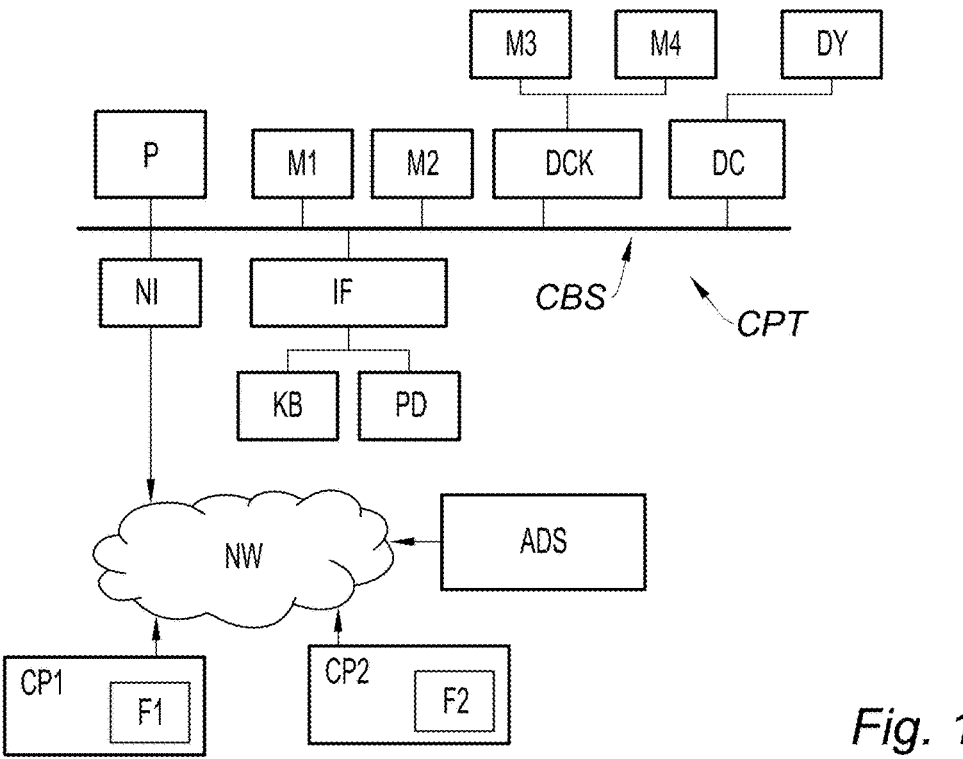
FIG. 10 is a block diagram of a computer system suitable for carrying out a method according to an embodiment of the invention.

A computer CPT suitable for carrying out a method according to an exemplary embodiment of the present invention is described with reference to FIG. 10. In FIG. 10, the computer CPT includes a Central Processing Unit (CPU) P which performs the method step described above while running an executable program, i.e. a set of computer-readable instructions, stored in a memory device such as RAM M1 or ROM M2 or hard disk drive (HDD) M3, DVD/CD drive M4, or stored remotely. Moreover, the data structure DS created in step a) of the inventive method may also be stored on one or more of memory devices M1 to M4, or remotely.

The claimed invention is not limited by the form of the computer-readable media on which the computer-readable instructions and/or the data structure of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU P and an operating system such as Microsoft VISTA, Microsoft Windows 10, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer CPT in FIG. 10 also includes a network interface NI, such as an Intel Ethernet PRO network interface card from Intel Corporation of America, for interfacing with a network, such as a local area network (LAN), wide area network (WAN), the Internet and the like. The computer further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands and by the computer for displaying the mass distribution, as illustrated on FIG. 9.

Disk controller DKC connects HDD M3 and DVD/CD M4 with communication bus CBS, which can be an ISA, EISA, VESA, PCI, or similar, for interconnecting all of the components of the computer.

A description of the general features and functionality of the display, keyboard, pointing device, as well as the display controller, disk controller, network interface and I/O interface is omitted herein for brevity as these features are known.

Network interface NI connects computer CPT to a system administrator ADS and to one or more other computers CP1, CP2, . . . through a network NW. Computer systems CP1, CP2 store files of different formats—F1, F2—containing data describing product parts. These data are gathered by computer CPT in order to create the data structure used for computing the mass distribution, as discussed above. This way, users of computers CP1, CP2 may continue working—e.g. perfecting the product design—while the mass distribution computation is performed by computer CPT.

In an alternative embodiment, computer CPT is replaced by a server and an end user computer. The overall architecture of the server may be the same as discussed above with reference to computer CPT, except that display controller, display, keyboard and/or pointing device may be missing in the server. The end user computer runs the front-end section of the "run" infrastructure, including the user interface; the server runs the "build" infrastructure and the back-end section of the "run" infrastructure. An action of the user on the user interface launches a query—e.g. a REST query—to a webservice provided by the server (e.g. an Apache server) which executes the mass distribution estimation algorithm. The overall architecture of the end user computer may also be the same as discussed above with reference to computer CPT, except that the memory devices of the end user computer do not store the executable program EXP and/or the data structure. However, the end user computer does store a client program designed for cooperating with the executable program of the server. In this embodiment, the mass distribution computation is performed by server SC, while end user computer EUC allows the user to interact with the server.

Network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

Any method steps described herein should be understood as representing modules, segments, or portions of code which include one or more executable instructions for implementing specific logical functions or steps in the process, and alternate implementations are included within the scope of the exemplary embodiment of the present invention.

While example embodiments have been particularly shown and described, it will be understood by those skilled in the art that various changes in form and details may be made therein without departing from the scope of the embodiments encompassed by the appended claims.

What is claimed is:

1. A computer-implemented method of estimating a mass distribution of a physical product comprising a plurality of product parts represented using physical product design data stored across a plurality of data sources, in multiple data formats, the method comprising:

(i) by one or more mass estimation computers:

a) from the plurality of data sources, gathering and reorganizing the physical product design data in the multiple data formats and incrementally building, during a designing user using a design user interface operatively connected to the one or more mass estimation computers for a computer-implemented design process of said physical product, a data structure comprising, for each product part, data representing a position and orientation of the part within the product, data representing a mass of the part and, for at least some product parts, data representing part geometry in voxel format, wherein building the data structure comprises recursively converting data representing product part geometries for the at least some product parts into the voxel format;

(ii) responsive to a mass estimation user requesting the estimate of the mass distribution of the physical product in a user interface operatively connected to the one or more mass estimation computers:

b) decomposing a digital model of the physical product into a plurality of slices perpendicular to a same axis, each slice being identified by its position along the axis;

c) for each slice, using the data structure for identifying a set of product parts of the data structure wholly or partially overlapping with the slice and, for each product part of the set, determining an overlap rate of the part and the slice using the position and geometry data stored in the data structure, wherein, for the at least some product parts, the geometry data is stored in the voxel format in the data structure;

d) attributing to each slice a mass value corresponding to a sum of the masses of all product parts overlapping with the slice, weighted by the respective overlap rates; and e) outputting, on the user interface of the one or more mass estimation computers, a mass distribution ($\lambda$) of the product along said axis having the mass value attributed to each slice of the physical product.

2. The computer-implemented method of claim 1 wherein, in step c), at least one product part for which the data structure contains no geometry data is considered to fully overlap with a single slice, determined by the position and orientation data of the product part in the data structure.

3. The computer-implemented method as claimed in claim 1 wherein the data structure contains, for at least one product part for which it does not contain geometry data:

data identifying a subset of the product to which said product part belongs, and data representing the geometry of said subset of the product in n-tree voxel format;

and wherein step c) comprises identifying slices wholly or partially overlapping with the product part and the respective overlap rates based on the geometry of the subset of the product to which said product part belongs.

4. The computer-implemented method as claimed in claim 1, wherein said voxel format is a n-tree voxel format.

5. The computer-implemented method as claimed in claim 1 further comprising a step of:

e2) estimating the mass distribution ($\lambda$) of the product along said axis by interpolating and smoothing the mass values attributed to the positions along the axis identifying each of said slices.

6. The computer-implemented method as claimed in claim 1 wherein the data structure also comprises, for at least one product part, data representing a mass tolerance and wherein step d) further comprises computing a tolerance for the mass values attributed to the positions along the axis identifying each slice overlapping with said product part.

7. A computer program product comprising:

a non-transitory computer-readable data-storage medium; and computer-executable instructions stored on the data storage medium which when executed cause a computer system to estimate a mass distribution of a physical product having a plurality of product parts represented using physical product design data stored across a plurality of data sources, in multiple data formats, the computer system estimating the mass distribution by:

(i) by one or more mass estimation computers:

a) from the plurality of data sources, gathering and reorganizing the physical product design data in the multiple data formats and creating, during a designing user using a design user interface operatively connected to the one or more mass estimation computers for a computer-implemented design process of the physical product, a data structure comprising, for each product part, data representing a position and orientation of the part within the physical product, data representing a mass of the part and, for at least some product parts, data representing part geometry in voxel format, wherein creating the data structure comprises recursively converting data representing product part geometries for the at least some product parts into the voxel format;

(ii) responsive to a mass estimation user requesting the estimate of the mass distribution of the physical product in a user interface operatively connected to the one or more mass estimation computers:

b) decomposing a digital model of the physical product into a plurality of slices perpendicular to a same axis, each slice being identified by its position along the axis;

c) for each slice, using the data structure for identifying a set of product parts of the data structure wholly or partially overlapping with the slice and, for each product part of the set, determining an overlap rate of the part and the slice using the position and geometry data stored in the data structure, wherein, for the at least some product parts, the geometry data is stored in the voxel format in the data structure;

d) attributing to each slice a mass value corresponding to a sum of the masses of all product parts overlapping with the slice, weighted by the respective overlap rates; and e) outputting, on the user interface of the one or more mass estimation computers, a mass distribution ($\lambda$) of the product along said axis having the mass value attributed to each slice of the physical product.

8. A non-transitory computer-readable data-storage medium comprising:

a memory area; and computer-executable instructions coupled to the memory area that configure a computer system to estimate a mass distribution of a physical product having a plurality of product parts represented using physical product design data stored across a plurality of data sources, in multiple data formats, the computer system estimating the mass distribution by:

(i) by one or more mass estimation computers:

a) from the plurality of data sources, gathering and reorganizing the physical product design data in the multiple data formats and creating, during a designing user using a design user interface operatively connected to the one or more mass estimation computers for a computer-implemented design process of the physical product, a data structure comprising, for each product part, data representing a position and orientation of the part within the product, data representing a mass of the part and, for at least some product parts, data representing part geometry in voxel format, wherein creating the data structure comprises recursively converting data representing product part geometries for the at least some product parts into the voxel format;

(ii) responsive to a mass estimation user requesting the estimate of the mass distribution of the physical product in a user interface operatively connected to the one or more mass estimation computers:

b) decomposing a digital model of the physical product into a plurality of slices perpendicular to a same axis, each slice being identified by its position along the axis;

c) for each slice, using the data structure for identifying a set of product parts of the data structure wholly or partially overlapping with the slice and, for each product part of the set, determining an overlap rate of the part and the slice using the position and geometry data stored in the data structure, wherein, for the at least some product parts, the geometry data is stored in the voxel format in the data structure;

d) attributing to each slice a mass value corresponding to a sum of the masses of all product parts overlapping with the slice, weighted by the respective overlap rates; and e) outputting, on the user interface of the one or more mass estimation computers, a mass distribution ($\lambda$) of the product along said axis having the mass value attributed to each slice of the physical product.

9. A Computer Aided Design system comprising:

a processor coupled to a non-transitory memory and a graphical user interface;

the non-transitory memory storing computer-executable instructions to cause the Computer Aided Design system to estimate a mass distribution of a physical product having a plurality of product parts represented using physical product design data stored across a plurality of data sources, in multiple data formats, the estimating being by:

(i) by one or more mass estimation computers:

a) from the plurality of data sources, gathering and reorganizing the physical product design data in the multiple data formats and creating during a designing user using a design user interface operatively connected to the one or more mass estimation computers for a computer-implemented design process of said physical product, a data structure comprising a data structure comprising, for each product part, data representing a position and orientation of the part within the product, data representing a mass of the part and, for at least some product parts, data representing part geometry in voxel format, wherein building the data structure comprises recursively converting data representing product part geometries for the at least some product parts into the voxel format;

(ii) responsive to a mass estimation user requesting the estimate of the mass distribution of the physical product in a user interface operatively connected to the one or more mass estimation computers:

b) decomposing a digital model of the physical product into a plurality of slices perpendicular to a same axis, each slice being identified by its position along the axis;

c) for each slice, using the data structure for identifying a set of product parts of the data structure wholly or partially overlapping with the slice and, for each product part of the set, determining an overlap rate of the part and the slice using the position and geometry data stored in the data structure, wherein, for the at least some product parts, the geometry data is stored in the voxel format in the data structure;

d) attributing to each slice a mass value corresponding to a sum of the masses of all product parts overlapping with the slice, weighted by the respective overlap rates; and e) outputting, on the user interface of the one or more mass estimation computers, a mass distribution ($\lambda$) of the product along said axis having the mass value attributed to each slice of the physical product.

10. The computer system of claim 9, the computer system further comprising:

a server;

an end user computer; and a plurality of computers connected over a network, the server being programmed for carrying out steps a) to d) of the estimating and the plurality of computers storing said physical product design data.

11. The computer-implemented method of claim 1, wherein said converting includes converting tessellated-format geometry data from said plurality of data sources to said voxel format.

12. A non-transitory computer-readable data-storage medium storing a data structure, said data structure comprising, for each one of a plurality of product parts of a physical product, data representing a position and orientation of the part within the physical product, data representing a mass of the part and, for at least some product parts, data representing part geometry in voxel format;

wherein the data structure is incrementally built using physical product design data stored across a plurality of data sources, in multiple data formats, by one or more mass estimation computers during a designing user using a design user interface operatively connected to the one or more mass estimation computers, where building the data structure comprises recursively converting data representing product part geometries for the least some product parts into the voxel format;

wherein, responsive to a mass estimation user requesting the estimate of the mass distribution of the physical product in a user interface operatively connected to the one or more mass estimation computers, the user interface outputs a mass distribution ($\lambda$) of the product along said axis having a mass value attributed to each slide of the physical product, the mass distribution calculated by:

decomposing a digital model of the physical product into a plurality of slices perpendicular to a same axis, each slice being identified by its position along the axis;

for each slice, using the data structure for identifying a set of product parts of the data structure wholly or partially overlapping with the slice and, for each product part of the set, determining an overlap rate of the part and the slice using the position and geometry data stored in the data structure, wherein, for the at least some product parts, the geometry data is stored in the voxel format in the data structure; and attributing to each slice a mass value corresponding to a sum of the masses of all product parts overlapping with the slice, weighted by the respective overlap rates.

13. The computer-implemented method as claimed in claim 1, wherein said voxel format is an octree voxel format.

\* \* \* \* \*